United States Patent [19]
Reyes, Jr. et al.

[11] Patent Number: 6,069,211
[45] Date of Patent: May 30, 2000

[54] CHROMATE-FREE, ONE-PART, NON-CURING CORROSION INHIBITIVE SEALANT WITH RESISTANCE TO AVIATION FUEL

[75] Inventors: Alfredo Reyes, Jr., North Hollywood; Frank Campbell, Altadena, both of Calif.

[73] Assignee: Courtaulds Aerospace, Inc., Glendale, Calif.

[21] Appl. No.: 09/187,679

[22] Filed: Nov. 6, 1998

Related U.S. Application Data

[60] Provisional application No. 60/064,941, Nov. 7, 1997.

[51] Int. Cl.⁷ .................................................. C08G 59/14
[52] U.S. Cl. ............................................................. 525/523
[58] Field of Search ............................ 524/114; 525/403, 525/523

[56] References Cited

U.S. PATENT DOCUMENTS

| | | | |
|---|---|---|---|
| 4,017,554 | 4/1977 | Villa | 260/830 |
| 4,153,743 | 5/1979 | Caramanian | 427/136 |
| 4,366,307 | 12/1982 | Singh et al. | 528/373 |
| 4,595,714 | 6/1986 | McAllister et al. | 523/445 |
| 4,656,095 | 4/1987 | McAllister et al. | 428/413 |
| 4,692,500 | 9/1987 | Hefner et al. | 525/529 |
| 4,728,712 | 3/1988 | Singh et al. | 528/75 |
| 4,983,692 | 1/1991 | Hefner et al. | 528/388 |
| 5,393,861 | 2/1995 | Sakae et al. | 528/388 |
| 5,494,729 | 2/1996 | Henry et al. | 525/403 |
| 5,610,243 | 3/1997 | Vietti et al. | 525/523 |

*Primary Examiner*—Veronica P. Hoke
*Attorney, Agent, or Firm*—Jeffer, Mangels, Butler & Marmaro LLP

[57] ABSTRACT

A non-curing sealant composition includes a monoepoxy compound, a polysulfide, and a tertiary amine catalyst, and optionally a liquid polythioether polymer having a functionality between about 2 and about 3. The composition is substantially free of chromates.

23 Claims, No Drawings

CHROMATE-FREE, ONE-PART, NON-CURING CORROSION INHIBITIVE SEALANT WITH RESISTANCE TO AVIATION FUEL

This application claims the benefit of U.S. Provisional Application No. 60/064,941, filed Nov. 7, 1997, now abandoned.

FIELD OF THE INVENTION

The present invention relates to an improved one-part, non-curing sealant composition.

BACKGROUND OF THE INVENTION

Most known one-part, non-curing sealant compositions include chromates, with some compositions having up to 24% chromates by weight. Use of chromates, particularly in large amounts, is hazardous and environmentally unfriendly. Furthermore, curing eventually occurs in such compositions with long-term exposure to high temperatures (240° F. and higher). Such compositions also tend to wash off the surfaces to which they are applied when they are exposed to aviation fuel at temperatures of 140° F. and higher.

A need exists for an improved one-part, non-curing sealant that avoids the foregoing problems.

SUMMARY OF THE PREFERRED EMBODIMENTS

In accordance with one aspect of the present invention, there is provided a non-curing sealant composition which includes a monoepoxy compound, a polysulfide polymer, and a tertiary amine catalyst. The composition is substantially free of chromates.

Preferably, the inventive composition remains in an uncured state after exposure to a temperature of 250° F. for 1000 hours.

In a preferred embodiment, the monoepoxy compound is a $C_{2-6}$ alkyl glycidyl ether, in particular butyl glycidyl ether.

The inventive composition also preferably includes one or more additives selected from the group consisting of fillers and salt corrosion inhibitors, and also preferably includes a solvent, such as ethyl acetate.

In a preferred embodiment, the inventive composition further includes a liquid polythioether polymer having a functionality between about 2 and about 3. More specifically, when the liquid polythioether polymer is included, the polysulfide is a non-reactive alkyl polysulfide.

In accordance with another aspect of the present invention, there is provided a method of making a non-curing sealant composition comprising the steps of: forming a mixture by combining a monoepoxy compound, a polysulfide polymer, and a tertiary amine catalyst, the mixture being substantially free of chromates; and heating the mixture at a temperature of at least about 160° F. for a time sufficient to afford a mercaptan equivalent weight of not less than 12,000.

In a preferred embodiment, in the first step a liquid polythioether polymer having a functionality between about 2 and about 3 is included in the mixture. In this embodiment, the polysulfide polymer preferably is a non-reactive alkyl polysulfide polymer.

Preferably, after the second step of the method, an additive selected from the group consisting of fillers and salt corrosion inhibitors is added to the mixture. A solvent, such as ethyl acetate, preferably is also added to the mixture after the second step.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The inventive composition is a one-part, non-curing sealant composition which includes a monoepoxy compound, a polysulfide polymer, preferably a high-molecular weight polysulfide polymer, and a tertiary amine catalyst. The composition is substantially free of chromates.

The term "substantially free of chromates" means having an amount of chromates less than 0.1 wt %, based on the non-volatile components of the composition, and preferably about 0 wt %. "Chromates" includes hexavalent chromium compounds including Group II compounds such as calcium, barium and strontium chromates, as well as other chromates such as zinc chromate.

As used herein, a "one-part sealant" denotes a sealant that is used or applied without requiring the addition of an additional ingredient prior to use.

As used herein, a "non-curing sealant" denotes a sealant that remains in an uncured state after application. Preferably, the inventive composition remains in an uncured state after exposure to a temperature of 250° F. for 1000 hours. The following test is employed to determine whether a given sealant is non-curing: a layer of the sealant to be tested is applied to an aluminum panel having the dimensions 40 mil×3 inch×6 inch. The sealant is applied in a layer having a thickness of 20 to 40 mils, a width of 1 to 2 inches and a length of 3 to 4 inches. The coated aluminum panel is then exposed to dry heat at 115–120° C. (about 240–250° F.) for 1000 hours. The sealant should still be tacky and easy to remove from the panel at the end of exposure.

Monoeroxy compounds useful according to the invention include alkyl and aryl glycidyl ethers, which may be further substituted with non-reactive and non-hindering groups. Preferred compounds include $C_{2-6}$ alkyl glycidyl ethers, in particular butyl glycidyl ether, and aryl glycidyl ethers such as phenyl glycidyl ether. The monoepoxy compound preferably is present in the composition in an amount from about 0.5 to about 10 wt %.

The inventive composition also includes a polysulfide polymer, preferably a high molecular weight polysulfide polymer. As used herein, a "high molecular weight polysulfide polymer" denotes a polysulfide type polymer having a molecular weight greater than about 20,000 Daltons. The high molecular weight polysulfide polymer improves the fuel resistance of the composition.

Exemplary polysulfides useful in the inventive composition include type MX and type WD-6 polysulfide polymers. Preferably, the composition includes about 10 to about 90 wt % of the selected polysulfide(s).

Useful tertiary amine catalysts for the inventive composition include diethylenetriamine (DET), 1,4-diaza-bicyclo[2.2.2]octane (DABCO®, commercially available from Air Products, Chemical Additives Division, Allentown, Pa. and DMP-30® (an accelerant composition including 2,4,6-tri(dimethylarninomethyl)phenol, commercially available from Rohm and Haas. Philadelphia, Pa.). Other known tertiary amine catalysts can also be used if desired.

Preferably the inventive composition includes about 0.01 to about 2 wt %, preferably about 0.2 to about 0.3 wt %, of the selected tertiary amine catalyst(s).

In a specific preferred embodiment, the inventive composition also includes a liquid polythicether polymer having a functionality between about 2 and about 3, that is, between aoout 2 and about 3 reactive groups per polymer molecule. Useful liquid polythioether polymers according to the invention include those described in copending, commonly assigned U.S. patent applications Ser. No. 08/802,130, filed Feb. 19, 1997 now U.S. Pat. No. 5,912,319, issued Jun. 15, 1999 and Ser. No. 08/928,972, filed Sep. 12, 1997; U.S. Pat. No. 4,366,307 to Singh et al.; and U.S. Pat. No. 4,609,762, to Morris et al. Other liquid polythioether polymers can also be used if desired. Preferably, the number average molecular weight of the selected liquid polythioether polymer(s) ranges from about 500 to about 20,000, preferably from about 1,000 to about 10,000, very preferably about 2,000 to about 5,000.

Preferably, the inventive sealant composition includes up to about 90 wt %, preferably about 10 to about 90 wt %, of the selected liquid polythioether polymer. Mixtures of two or more polymers can also be used if desired. When the liquid polythioether polymers are used, the monoepoxy compound preferably is present in the composition in the proportion from about 1:1 to about 1:1.15, preferably about 1.1 to about 1:1.05, based on the number of moles of liquid polythioether polymer(s) present in the composition. Below this range, excess free mercaptan groups will be present and will result in oxidation and skin formation (due to formation of disulfide linkages). Above this range, excess epoxy will be present and may self-react.

In a more specific embodiment, when the liquid polythioether polymer is used, the polysulfide polymer is a non-reactive alkyl polysulfide.

In the foregoing description of the preferred quantities of the various ingredients of the composition, all wt % are based on the non-volatile components of the composition.

Preferably, the composition further includes a solvent or mixture of solvents to improve the brushability of the composition. Useful solvents include lower alkyl (e.g., $C_{1-6}$) esters, for example ethyl acetate, lower alkyl ketones such as acetone, methyl ethyl ketone, etc., aromatic solvents such as xylene and toluene, ethers such as dioxane, etc. Preferably the composition includes about 0.05 to about 10%, more preferably about 3 to about 10 wt %, of the solvent or solvents, with the amount of solvent being based on the total weight of the composition.

Preferably, the inventive composition also includes about 1 to about 30 wt % of at least one additive selected from the group consisting of fillers and salt corrosion inhibitors.

Fillers useful in the inventive compositions include water-ground mica and silica. Other known fillers can also be used.

Useful salt corrosion inhibitors include calcium strontium zinc phosphosilicate; (2-benzothiazolylthio)succinic acid, titanium dioxide, and zinc orthophosphate. Other useful salt corrosion inhibitors are disclosed in copending U.S. patent application Ser. No.08/731,066, which is incorporated herein by reference.

The sealant compositions according to the invention have excellent resistance to aviation fuel. Resistance to aviation fuel can be quantified according to the following method: a layer of the sealant composition having a thickness of 20 mils (0.020 inch) is applied to a surface. The surface is immersed in a vertical orientation in jet reference fluid (JRF) type 1 at a temperature of 160° F. for 48 hours. The composition is resistant to aviation fuel for the purposes of this invention if a maximum downward flow or "sag" of 2 mm (0.1 inch) is measured.

JRF type 1, as employed herein for determination of fuel resistance, has the following composition (see AMS 2629, issued Jul. 1, 1989), section 3.1.1 et seq., available from SAE (Society of Automotive Engineers, Warrendale, Pa.):

| | |
|---|---|
| Toluene | 28 ± 1% by volume |
| Cyclohexane (technical) | 34 ± 1% by volume |
| Isooctane | 38 ± 1% by volume |
| Tertiary dibutyl disulfide (doctor sweet) | 1 ± 0.005% by volume |
| Tertiary butyl mercaptan | 0.015% ± 0.0015 by weight of the other four components |

The inventive compositions can be prepared according to the following method. In a first step, a mixture is formed by combining a monoepoxy compound, a polysulfide polymer, a tertiary amine catalyst as described herein, and optionally a liquid polythioether polymer having a functionality between about 2 and about 3, the mixture being substantially free of chromates. Next, the mixture so formed is heated at a temperature of at least about 140° F. for a time sufficient to afford a mercaptan equivalent weight of not less than 12,000, more preferably not less than 16,000, very preferably not less than 20,000.

As known to those skilled in the art, the mercaptan equivalent is a measure of the extent of conversion of the thiol-terminated polymer (e.g., the polysulfide and/or the polythioether polymer), that is, the extent of reaction between the polymer and the monoepcxy compound. A mercaptan equivalent of 12,000 indicates that one mercaptan equivalent is present per 12,000 g of polymer. Mercaptan equivalent can be determined by conventional methods such as iodine titration.

The heating step is preferably carried out at a temperature of at least about 140° F., preferably about 140 to about 200° F., more preferably about 160 to about 180° F., very preferably about 160° F. The upper limit on the temperature will be that temperature at which the selected monoepoxy compound begins to self-react.

The heating step preferably is carried out for a time from about 12 to about 48 hours, depending on the ingredients selected for use in the composition.

Preferably, after the second step of the method, an additive selected from the group consisting of fillers and salt corrosion inhibitors is added to the mixture. A solvent, such as ethyl acetate, preferably is also added to the mixture after the second step.

The inventive compositions are useful in a variety of applications, including without limitation control system joints, wet installed bushings, protection of landing gear metals, seat tracks, main rotors and rear rotor assemblies, transmission assemblies ard protection of dissimilar or similar metals with easy disassembly.

The invention is further illustrated by the following non-limiting examples. In Example 1, a liquid polythioether polymer was first prepared according to the methods described in copending U.S. patent application Ser. No. 08/802,130 and Ser. No. 08/928,972, incorporated herein in their entireties by reference. Other polythioether polymers can also be used, and the present invention is not limited to the use of such polymers.

EXAMPLE 1

In a 2 liter flask, 524.8 g (3.32 mole) of diethylene glycol divinyl ether (DEG-DVE) and 706.7 g (3.87 mole) of dimercaptodioxaoctane (DMDO) were mixed with 19.7 g (0.08 mole) of triallylcyanurate (TAC) and heated to 77° C. To the heated reaction mixture was added 4.6 g (0.024 mole) of an azobisnitrile free radical catalyst (VAZO®67 [2,2'-azobis (2-methylbutyronitrile)], commercially available from DuPont). The reaction proceeded substantially to completion after 2 hours to afford 1250 g (0.39 mole, yield 100%) of a liquid polythioether resin having a $T_g$ of −68° C. and a viscosity of 65 poise. The resin was faintly yellow and had a low color.

Next, 100 grams (0.069 equivalents) of the foregoing thiol terminated polythioether polymer, 9.0 grams (0.069 equivalents) of butyl glycidyl ether and 0.05 grams of diaizabicyclooctane were mixed together and heated at 160° F. until a mercaptan equivalent weight of 12,000 grams/equivalent or greater was reached. To this mixture were added 2 grams of WD-6 polysulfide polymer (mercaptan equivalent weight >12,000 grams/equivalent, commercially available from Morton Adhesives and Chemical Specialties, Chicago, Ill.), 10 grams of water ground mica and 10 grams of zinc orthophosphate. The entire mixture was vigorously agitated until the filler particles were thoroughly and homogeneously dispersed.

The resulting sealant was spread on an aluminum dish and heated in a recirculating a r oven for 2 weeks at 200° F. No evidence of curing or skinning was noted.

EXAMPLE 2

100 Grams (0.034 equivalents) of a 50:50 blend of WD-6 and LP-2 polysulfide polymer (both available from Morton Adhesives and Chemical Specialties), 4.5 grams (0.034 equivalents) of butyl glycidyl ether and 0.05 grams of diazabicyclooctane are mixed together and heated at 160° F. until a mercaptan equivalent weight of 18,000 grams/equivalent or greater was reached. To this mixture were added 10 grams of titanium dioxide and 10 grams of zinc orthophosphate. The entire mixture was vigorously agitated until the filler particles were thoroughly and homogeneously dispersed.

The resulting sealant was spread on an aluminum dish and heated in a recirculating air oven for 2 weeks at 200° F. No evidence of curing or skinning was noted. The sealant was spread on an aluminum panel and immersed in a 3.5% NaCl water solution for 7 days. Upon removal of the sealant, no evidence of corrosion was observed.

What is claimed:

1. A non-curing sealant composition comprising
   (a) a monoepoxy compound selected from the group consisting of alkyl glycidyl ethers and aryl glycidyl ethers,
   (b) a polysulfide polymer
   (c) a tertiary amine catalyst, said composition being substantially free of chromates.

2. The composition of claim 1 which remains in an uncured state after exposure to a temperature of 250° F. for 1000 hours.

3. The composition of claim 1 having a mercaptan equivalent of at least 12,000.

4. The composition of claim 1 wherein said monoepoxy compound is a $C_{2-6}$ alkyl glycidyl ether.

5. The composition of claim 4 wherein said monoepoxy compound is butyl glycidyl ether.

6. The composition of claim 1 wherein said monoepoxy compound is phenyl glycidyl ether.

7. The composition of claim 1 further comprising (d) a liquid polythioether polymer having a functionality between about 2 and about 3.

8. The composition of claim 7 wherein said liquid polythioether polymer has a number average molecular weight ranging from about 500 to about 20,000.

9. The composition of claim 7 comprising a plurality of said liquid polythioether polymers.

10. The composition of claim 7 wherein the molar ratio of ingredient (d) to ingredient (a) ranges from about 1:1 to about 1:15.

11. The composition of claim 7 wherein said polysulfide polymer is a non-reactive alkyl polysulfide.

12. The composition of claim 1 further comprising an additive selected from the group consisting of fillers and salt corrosion inhibitors.

13. The composition of claim 1 further comprising a solvent.

14. The composition of claim 13 wherein said solvent is ethyl acetate.

15. A non-curing sealant composition comprising
   (a) about 0 to about 90 wt % of a liquid polythioether polymer having a functionality between about 2 and about 3,
   (b) about 0.5 to about 10 wt % of a monoepoxy compound selected from the group consisting of aryl glycidyl monoepoxides and alkyl glycidyl monoepoxides,
   (c) about 10 to about 90 wt % of a non-reactive alkyl polysulfide polymer, and
   (d) about 0.01 to about 2 wt % of a tertiary amine catalyst, wherein all wt % are based on the non-volatile components of the composition, said composition being substantially free of chromates.

16. The composition of claim 15 comprising about 10 to about 90 wt % of ingredient (a).

17. The composition of claim 15 further comprising about 0.05 to about 10 wt % of a solvent.

18. The composition of claim 15 further comprising about 1 to about 30 wt % of at least one additive selected from the group consisting of fillers and salt corrosion inhibitors.

19. A method of making a non-curing sealant composition comprising:
   (i) forming a mixture by combining
      (a) a monoepoxy compound selected from the group consisting of alkyl glycidyl monoepoxides and aryl glycidyl monoepoxides,
      (b) a thiol terminated polysulfide polymer,
      (c) a tertiary amine catalyst said mixture being substantially free of chromates, and
   (ii) fleating said mixture at a temperature of at least about 160° F. for a time sufficient to afford a mercaptan equivalent weight of not less than 12,000.

20. The method of claim 19 wherein in step (i) said mixture further comprises (d) a liquid polythioether polymer having a functionality between about 2 and about 3.

21. The method of claim 20 wherein in step (i) said polysulfide polymer is a non-reactive alkyl polysulfide.

22. The method of claim 20 wherein after step (ii) an additive selected from the group consisting of fillers and salt corrosion inhibitors is added to said mixture.

23. The method of claim 20 wherein after step (ii) a solvent is added to said mixture.

* * * * *